United States Patent
Yuan et al.

(10) Patent No.: US 8,919,575 B2
(45) Date of Patent: Dec. 30, 2014

(54) BITUMEN FROTH STORAGE AND SEPARATION USING AN IMPROVED FROTH TANK

(75) Inventors: Simon Yuan, Fort McMurray (CA); Jim Lorentz, Fort McMurray (CA); Jessica Vandenberghe, Edmonton (CA)

(73) Assignee: Syncrude Canada Ltd. in trust for the owners of the Syncrude Project as such owners exist now and in the future, Fort McMurray (CA)

( * ) Notice: Subject to any disclaimer, the term of this patent is extended or adjusted under 35 U.S.C. 154(b) by 174 days.

(21) Appl. No.: 13/430,314

(22) Filed: Mar. 26, 2012

(65) Prior Publication Data

US 2013/0248424 A1 Sep. 26, 2013

(51) Int. Cl.
| | |
|---|---|
| *B03D 1/14* | (2006.01) |
| *C10G 1/04* | (2006.01) |
| *C10C 3/08* | (2006.01) |
| *B01D 21/06* | (2006.01) |
| *B01D 21/28* | (2006.01) |
| *B01D 21/34* | (2006.01) |

(52) U.S. Cl.
CPC ............... *B03D 1/1493* (2013.01); *C10C 3/08* (2013.01); *C10G 1/045* (2013.01); *B01D 21/06* (2013.01); *B01D 21/286* (2013.01); *B01D 21/34* (2013.01); *B03D 2203/006* (2013.01); *B01D 2221/04* (2013.01)

USPC ........ 210/523; 210/513; 210/532.1; 208/390; 208/391

(58) Field of Classification Search
CPC ............ C10G 1/04; C10G 1/047; C10C 3/08; B03D 2203/006; B03D 1/1412; B03D 1/1481
USPC ........ 208/390, 391; 210/513, 523, 528, 532.1
See application file for complete search history.

(56) References Cited

U.S. PATENT DOCUMENTS

| | | | | |
|---|---|---|---|---|
| 4,105,537 | A | * | 8/1978 | McQuitty ........................ 406/19 |
| 4,107,029 | A | * | 8/1978 | Lorenz .......................... 210/739 |
| 5,599,463 | A | * | 2/1997 | Hedrick ........................ 210/800 |

FOREIGN PATENT DOCUMENTS

| | | |
|---|---|---|
| CA | 2055213 | 5/1993 |
| CA | 2214538 | 9/1996 |

\* cited by examiner

*Primary Examiner* — Renee E Robinson
(74) *Attorney, Agent, or Firm* — Bennett Jones LLP

(57) ABSTRACT

The invention is directed to a process for separating bitumen froth into an upper bitumen-rich, reduced-solids layer, and a lower concentrated solids layer using a cone-bottomed, raked froth tank. The process involves introducing bitumen froth into the froth tank; rotating at least one movable picket through the bitumen froth; recovering the upper bitumen-rich, reduced-solids layer; and withdrawing the lower concentrated solids layer from the tank.

7 Claims, 11 Drawing Sheets

Effect of residence time on underflow component contents

Effect of feed composition on U/F component contents when U/F split ratio is 7.5%

Effect of feed composition on U/F component contents when U/F split ratio is 15%

Effect of feed composition on U/F component contents when U/F split ratio is 50%

BITUMEN FROTH STORAGE AND SEPARATION USING AN IMPROVED FROTH TANK

FIELD OF THE INVENTION

The present invention relates generally to the field of oil sands processing, particularly to a process for storing and separating bitumen froth using an improved froth tank.

BACKGROUND OF THE INVENTION

Oil sand deposits such as those found in the Athabasca Region of Alberta, Canada, generally comprise water-wet sand grains held together by a matrix of viscous heavy oil or bitumen. Bitumen is a complex and viscous mixture of large or heavy hydrocarbon molecules which contain a significant amount of sulfur, nitrogen and oxygen. Oil sands processing involves mining the oil sand, bitumen water extraction and bitumen froth treatment to produce diluted bitumen which is further processed to produce synthetic crude oil and other valuable commodities.

Extraction is typically conducted by mixing the oil sand with steam, hot water and caustic. After extraction, the froth is initially stored in a large capacity froth storage tank until a sufficient volume is collected for subsequent froth treatment. The tank also acts as a surge vessel to absorb sudden fluctuations/changes in production rates. A froth storage tank is typically flat-bottomed (FIG. 1). However, the residence time within the tank is of sufficient duration to settle a portion of the solids from the froth. Build-up of solids within the tank may reach up to 30% by volume, such that the tank must be operated in the level of about 30-88% of capacity. Removal of the settled solids from the tank using a pump is often unsuccessful due to the loss of the solids slurry/froth interface. This loss is attributed to the uneven settling of solids on the bottom of the tank coupled with uneven removal resulting from coning of the solids. The solids build-up reduces both the capacity and ability of the tank to act as a surge vessel. The uneven deposition of solids can result in periodic sloughing of solids into the froth treatment process during times of low tank levels or large rate changes, causing major upsets in downstream equipment including, for example, overload of centrifuges and filters. Cleaning of the tank is typically conducted by cutting a hole through the tank sidewall and removing the accumulated solids using a loader to alleviate the problem temporarily for about two to three months. In addition, conventional froth storage tanks tend to have limited mixing capability.

Accordingly, there is a need in the art for an improved process and apparatus for storing and separating bitumen froth.

SUMMARY OF THE INVENTION

The present invention relates generally to a process for storing and separating bitumen froth using an improved froth tank.

In one aspect, the invention comprises a froth tank defining an inner chamber having a cylindrical upper portion and a conical lower portion, and comprising a plurality of stationary and movable pickets disposed within the inner chamber for separating bitumen froth into an upper bitumen-rich, reduced-solids layer, and a lower concentrated solids layer.

In one embodiment, the slope of the lower portion is about 1:6. In one embodiment, the tank further comprises a bridge portion spanning across the upper portion to support the stationary pickets and a rotary drive assembly. In one embodiment, the tank further comprises an elongate drive shaft mounted in a substantially vertical orientation within the inner chamber, and connecting the rotary drive assembly to a rake assembly mounted for rotation about a vertical axis within the lower portion. In one embodiment, a torque sensor detects the torque exerted upon the drive shaft, and transmits signals representative of the torque to a controller.

In one embodiment, the rake assembly comprises rake arms attached to the drive shaft and carrying the movable pickets. In one embodiment, the movable pickets extend parallel to one another vertically, and are sufficiently spaced apart to accommodate the stationary pickets extending downwardly therebetween.

In another aspect, the invention comprises a process for separating bitumen froth into an upper bitumen-rich, reduced-solids layer, and a lower concentrated solids layer, comprising:
  introducing bitumen froth into a froth tank defining an inner chamber having a cylindrical upper portion and a conical lower portion for a pre-determined residence time;
  operating an internal rake assembly in the froth tank intermittently or continuously to move settled solids across the conical portion of the tank; and
  recovering the upper bitumen-rich, reduced-solids layer, and the lower concentrated solids layer from the tank through their respective outlets in the tank.

In one embodiment, the residence time ranges from between about two to about twenty-four hours. In one embodiment, the residence time ranges between about two to about four hours. In one embodiment, an underflow split ratio ranges from between about 0% to about 50% by volume. In one embodiment, the underflow split ratio is about 7.5% by volume. In one embodiment, the bitumen froth has a temperature ranging from between about 70° C. to about 90° C. At this temperature range, the density inversion between water and bitumen allows for better separation, as the bitumen will migrate upwards and the water will migrate downwards.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF PREFERRED EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practised without these specific details.

The present invention relates generally to a process for storing and separating bitumen froth using an improved froth tank.

Figure 1:
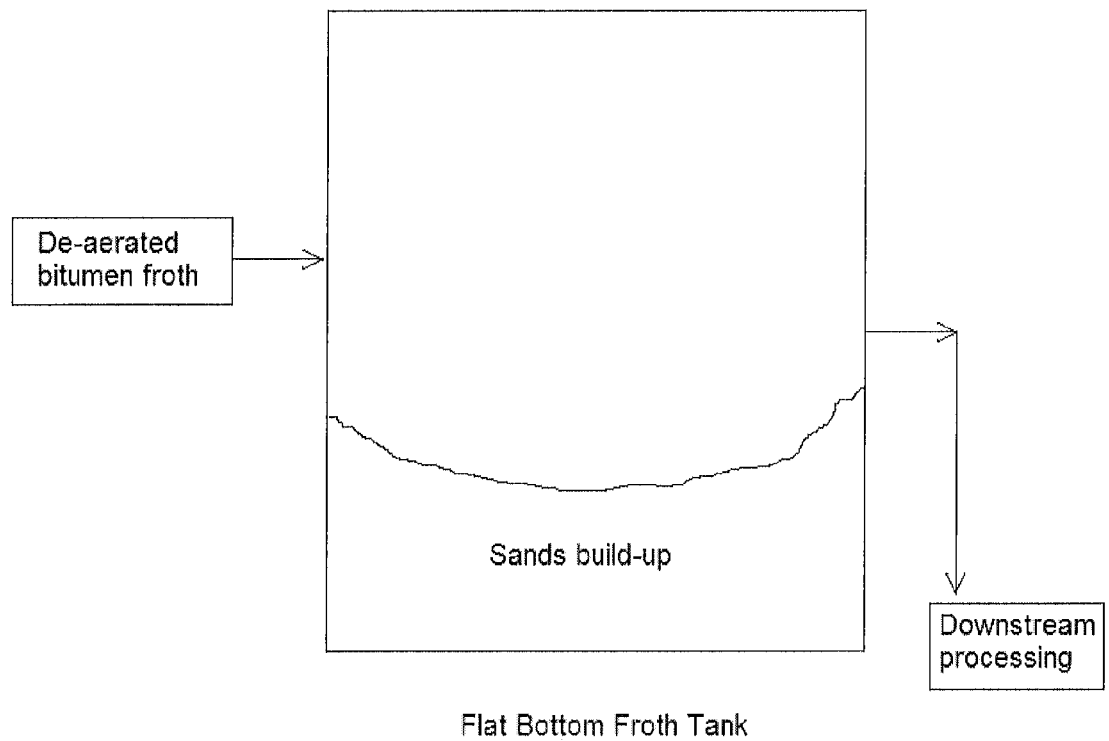
FIG. 1 is a sectional side view of a conventional, prior art flat-bottomed froth tank.
Figure 2:
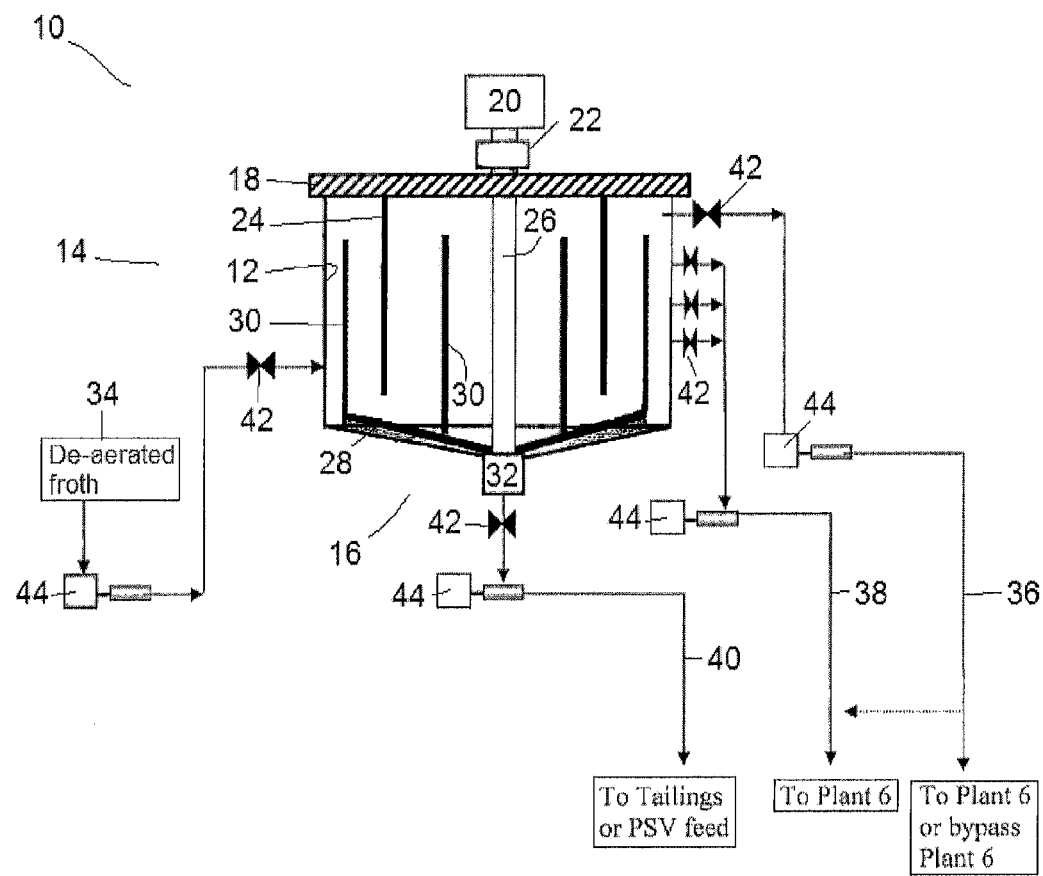
FIG. 2 is a sectional side view of one embodiment of a cone-bottomed froth tank comprising an internal rake assembly.

FIG. 2 shows one embodiment of a froth tank (10) useful in the present invention which generally defines an inner chamber (12) having a generally cylindrical upper portion (14) and a generally conical lower portion (16). A bridge portion (18) spans across the upper portion (14) to support a rotary drive assembly (20), a torque sensor (22), and a plurality of stationary pickets (24).

The tank (10) can be open or closed to the external environment. A roof may be included to cover the tank (10) to prevent contamination and release of odors, and to maintain slurry temperature. Such roofs are typically made from fiberglass plates which are supported by the tank (10) and the bridge portion (18).

The rotary drive assembly (20) includes a motor (not shown) attached to a drive gear box (not shown). The motor may be of fixed or variable speed, and use any suitable motive power, such as an electric or hydraulic motor or a combustion engine. An elongate drive shaft (26) is mounted at a first end in operational engagement with the motor and at a second end to the apex of the conical portion (16). The drive shaft (26) is thus mounted in a substantially vertical orientation within the inner chamber (12) of the tank (10).

The drive shaft (26) connects the rotary drive assembly (20) to a rake assembly which is mounted for rotation about a generally vertical axis within the conical portion (16) of the tank (10). The rake assembly comprises rake arms (28) which are attached to the drive shaft (26), and a plurality of generally vertical movable pickets (30) carried by the rake arms (28). The rake arms (28) may comprise generally straight or curved blades. The rake arms (28) are positioned at the apex of the conical position (16) of the tank (10) to move settled solids across the conical portion (16) of the tank (10) for "funnelling" or discharge at a central underflow outlet (32). In one embodiment, the slope of the conical portion (16) is about 1:6, i.e., the walls of the cone are at an angle of about 15 degrees.

The movable pickets (30) extend parallel to one another vertically, and are sufficiently spaced apart to accommodate the downwardly projecting stationary pickets (24) therebetween. As the rake arms (28) rotate, the movable pickets (30) travel around the stationary pickets (24) through the bitumen froth (34).

As a consequence of its connection to the rake assembly, the drive shaft (26) is subjected to very high torques when rotated. The degree of torque is dependent upon the resistance to rotation experienced by the drive shaft (26). This resistance arises primarily as a result of the rake arms (28) and movable pickets (30) encountering resistance as they rotate through the settled solids and bitumen froth, respectively. The torque sensor (22) is used to detect the torque exerted upon the drive shaft (26), and transmit signals representative of the measured or recorded torque to a controller (not shown). The controller may be operatively connected to the motor to control the operation of the drive shaft (26) based on the signals received from the torque sensor (22).

The tank (10) includes an inlet (not shown) through which bitumen froth (34) is pumped into the tank (10) above the conical portion (16). The inlet is oriented tangential to the tank (10), thereby dampening the turbulence of the incoming bitumen froth (34) and generating a swirling flow when feeding the bitumen froth (34) into the inner chamber (12). Outlets (not shown) are oriented tangential to the tank (10) to allow the bitumen froth (36), middlings (38), and tailings (40) to be separately withdrawn and further processed. In one embodiment, the bitumen froth outlet may be a circumferential weir or a surface floating discharge.

The tank (10) is interconnected to other components (such as, for example, valves (42), pumps (44), and other tanks, tailings ponds or plants) by conduits which may be constructed from any suitable piping as is employed in the art. Suitable piping includes, without limitation, plastic piping, galvanized metal piping, and stainless steel piping. The conduits have associated valves (42) which may be opened and closed to divert the flows of the separated bitumen froth, middlings, and tailings among the interconnected components. The valves (42) may comprise any suitable valve employed by those skilled in the art to permit, or prevent, the flow of the bitumen froth (36), middlings (38), and tailings (40) through a conduit. Suitable valves (42) include, but are not limited to, gate valves, butterfly valves, and ball valves.

Bitumen froth may contain about 60 wt % bitumen, about 30 wt % water and about 10 wt % solid mineral material, of which a large proportion is fine mineral material. The bitumen which is present in a bitumen froth comprises both non-asphaltenic material and asphaltenes. The bitumen froth (34) is pumped into the froth storage tank (10) above the conical portion (16) of the tank (10). A portion of the solids settles during the residence time. In one embodiment, the residence time may range from between about two to about twenty-four hours, preferably about six to about eighteen hours, and most preferably about two to about four hours.

During the residence time, the motor may be activated intermittently or continuously to operate the rotary drive assembly (20) at a desired speed, thereby rotating the drive shaft (26) and the rake arms (28). As the rake arms (28) rotate, the movable pickets (30) travel around the stationary pickets (24) through the bitumen froth (34), thereby generating flow channels which facilitate separation of a top layer of bitumen froth (36), a middle layer of middlings (38) (i.e., warm water, fines, residual bitumen), and a bottom layer of coarse tailings (40) (i.e., warm water, coarse solids, residual bitumen). The bitumen froth (36), middlings (38), and tailings (40) are then separately withdrawn and further processed.

The upper bitumen-rich, reduced-solids layer (36) overflows the top of the tank (10), and is withdrawn for the froth treatment process which eliminates the aqueous and solid contaminants from the bitumen froth to produce a clean bitumen product for downstream upgrading processes. The bitumen froth is diluted with a hydrocarbon solvent (i.e., either a paraffinic or naphthenic type diluent) to reduce the viscosity and density of the oil phase, thereby accelerating the settling of the dispersed phase impurities by gravity or centrifugation.

The middlings (38) are withdrawn from the mid-section of the tank upper portion (14) and pumped to a secondary processing unit.

The rake arms (28) move the settled solids (40) across the conical portion (16) of the tank (10). Since the bottom of the tank (10) is conical shaped, the solids (40) are easily discharged downwardly into the central underflow outlet (32) to be withdrawn as an underflow and pumped to a tailings pond or secondary processing unit.

Using the present invention, it was found that the use of the cone-bottomed froth storage tank (10) having an internal rake assembly facilitates the storage of bitumen froth and the separation of the bitumen froth, middlings, and tailing. Solids may be removed intermittently or continuously as warranted during the feed residence time to maintain the capacity and ability of the tank (10) to act as a surge vessel. The froth tank capacity is increased by approximately 25-30% by eliminating solids accumulations. Further, the tank (10) reduces the risk of sloughing of solids into the subsequent froth treatment process. About 30-40% of solids and 15-20% of water are pre-separated from the bitumen froth and rejected to tailings through the underflow stream of the froth tank (10). Higher quality bitumen feed is thus produced for further upgrading, thereby minimizing malfunctions in downstream equipment and enhancing the overall productivity of the processing plants.

By way of example, the middlings stream (38) can be amenable to further upgrading, for example, using a two-stage centrifugation process with naphtha added to reduce viscosity in a froth treatment plant (Pant 6). Bitumen froth (36) can also be treated in a froth treatment plant but may be of sufficient quality (i.e., reduced solids and water content) that a froth treatment plant can be bypassed and the bitumen froth (36) can go directly to upgraders such as cokers and the like. The tailings (40) may be sufficiently cleaned of bitumen that the tailings can be directly deposited in tailings deposit sites. In the alternative, residual bitumen in the tailings can be recaptured by recycling this stream back to the primary separation vessels (PSVs) where the bitumen froth is originally formed.

It will be appreciated by those skilled in the art that the tank (10) of the present invention may be used to remove solids present in various materials including, but not limited to, raw de-aerated bitumen froth; bitumen froth diluted at low (<0.8 w/w) or normal (0.8 w/w) naphtha:bitumen ratios; high-density solids/pastes; and the like.

Exemplary embodiments of the present invention are described in the following Examples, which are set forth to aid in the understanding of the invention, and should not be construed to limit in any way the scope of the invention as defined in the claims which follow thereafter.

EXAMPLE 1

Testing of Cone-Bottomed, Raked Froth Tank

Pilot tests were conducted to assess the ability of a cone-bottomed, raked froth tank to function as a froth cleaner and storage tank; the effects of bulk froth residence time, underflow split ratios, and feed compositions on solids/water and bitumen separation in the froth tank; and the effect of stationary and movable pickets along with the rake arms on the separation of solids/water and bitumen.

The test conditions are summarized in Table 1:

TABLE 1

| Test Conditions | |
|---|---|
| Fixed variables | Froth temperature: 80° C.<br>Rake turned-on at 1.24 rpm with moving and static pickets<br>Elevation of feed injection: 1 m above the knuckle<br>Elevation of middlings withdrawal: 1.5 m above the knuckle<br>Operating level of froth in the tank: 2 m above the knuckle<br>De-aerated froth obtained from Aurora froth tank |
| Independent variables | Bulk froth residence time: 1, 2 and 4 hours by changing feed flow rates from 3, 1.5 to 0.75 L/s<br>Underflow split ratios: 3.75%, 7.5%, 15% and 50% by volume<br>Feed compositions: "as is", meaning about 54% bitumen, about 30% water and about 16% sand ($D_{50}$ 300 μm) |

The experimental results indicate that the bulk froth residence time, underflow split ratio ("U/F," the ratio of the underflow to the feed flow rate), feed composition, and the use of pickets had significant effects on the separation between solids/water and bitumen in the froth tank.

Figure 3:
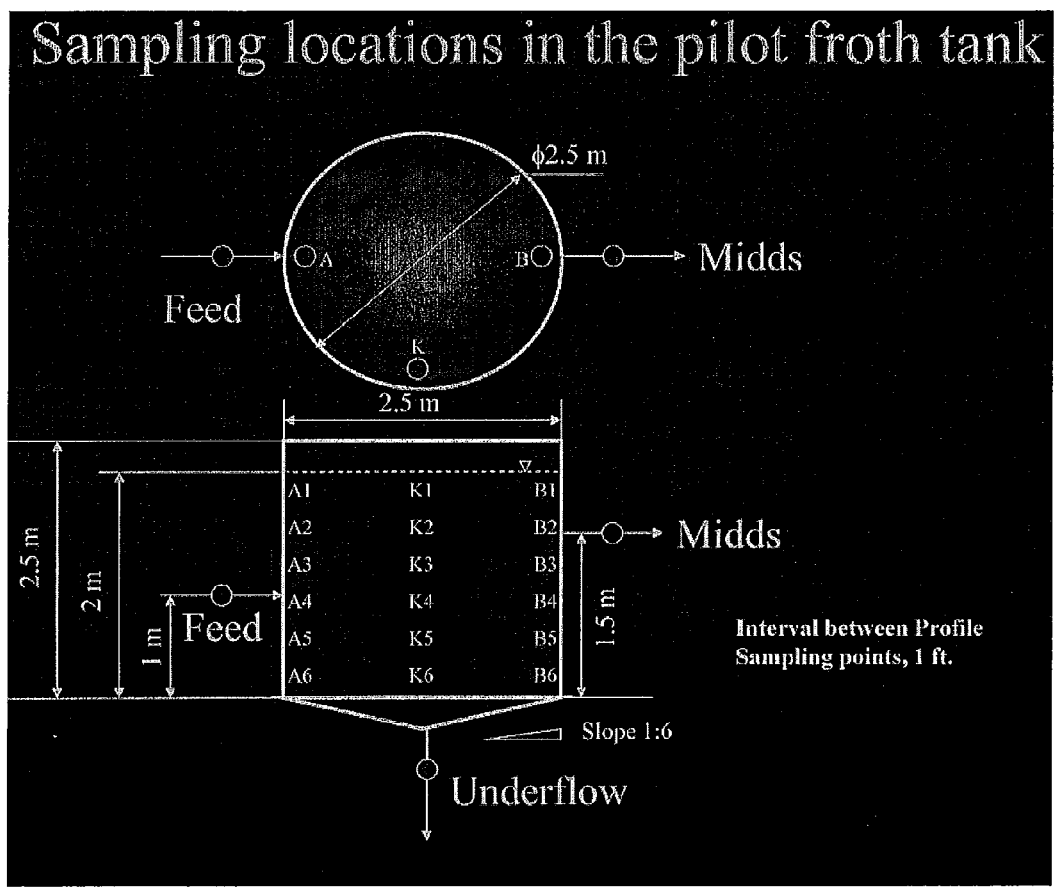
FIG. 3 is a sectional side view of one embodiment of a cone-bottomed froth tank showing sampling locations above the knuckle of the froth tank.
Figure 4:
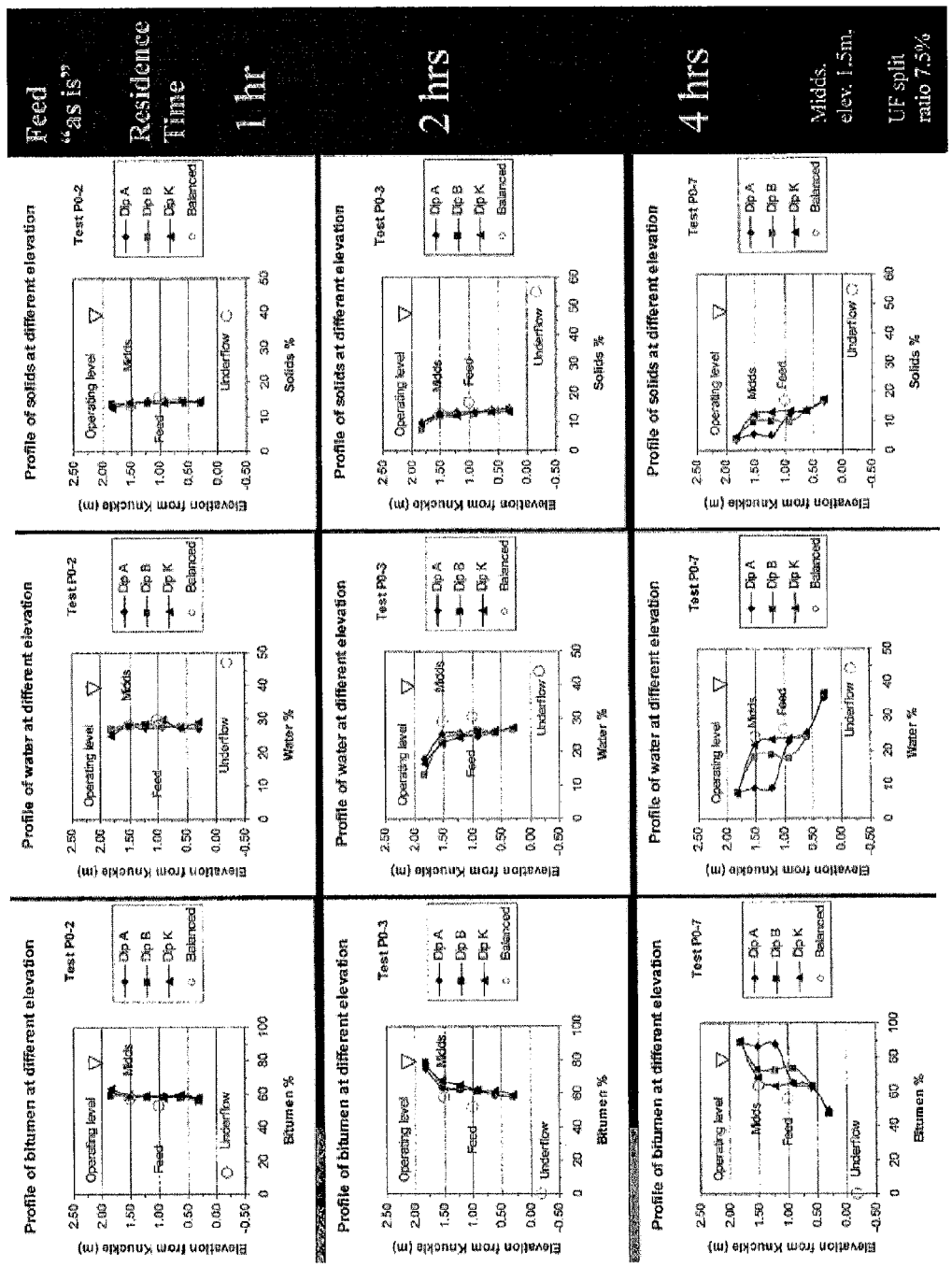
FIG. 4 shows graphs indicating the profiles of bitumen, water and solids sampled at different withdrawal elevations above the knuckle of the froth tank at residence times of 1, 2 and 4 hours.
Figure 5:
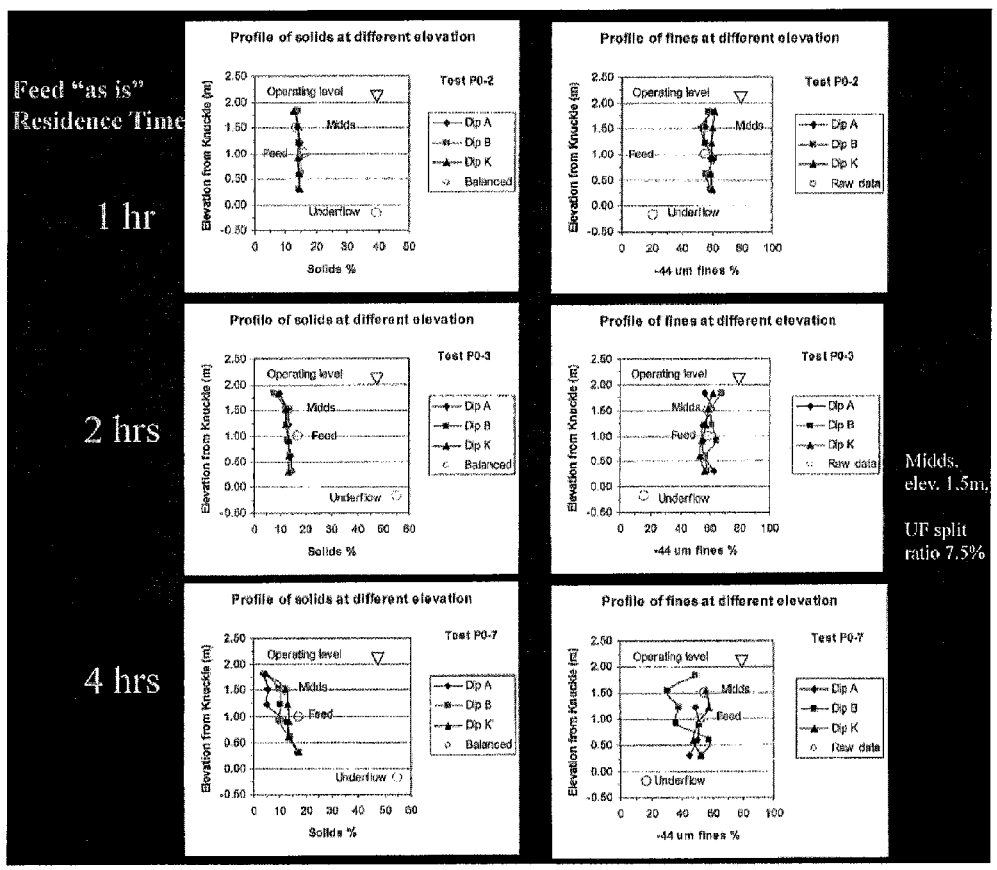
FIG. 5 shows graphs indicating the profiles of solids and fines sampled at different withdrawal elevations above the knuckle of the froth tank at residence times of 1, 2 and 4 hours.
Figure 6A:
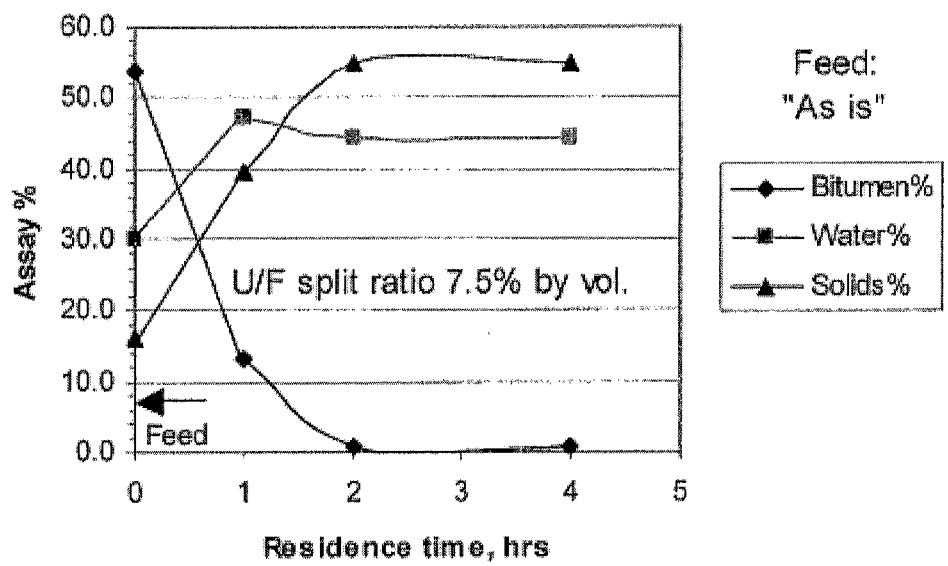
FIGS. 6A-B are graphs showing the effect of residence time on underflow component contents.
Figure 6B:
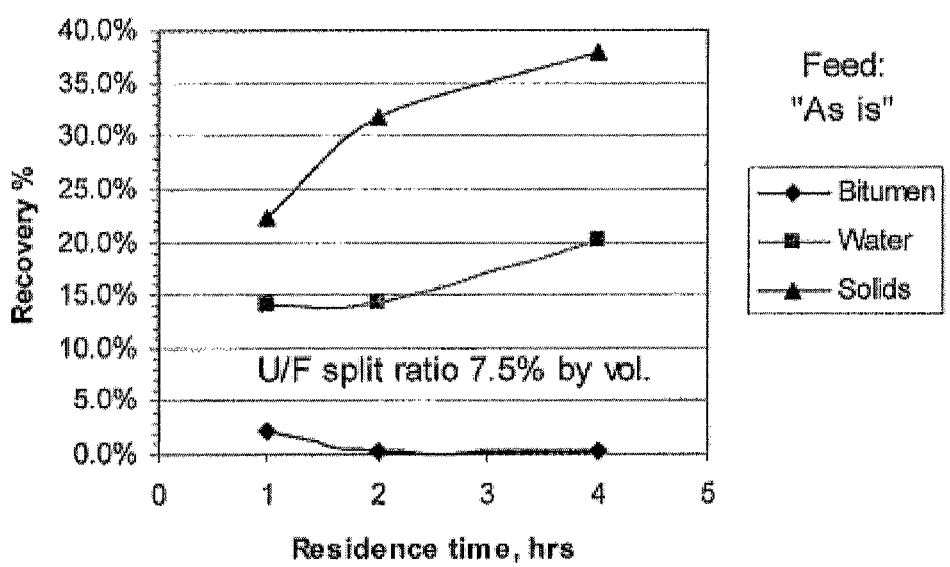
Figure 7A:
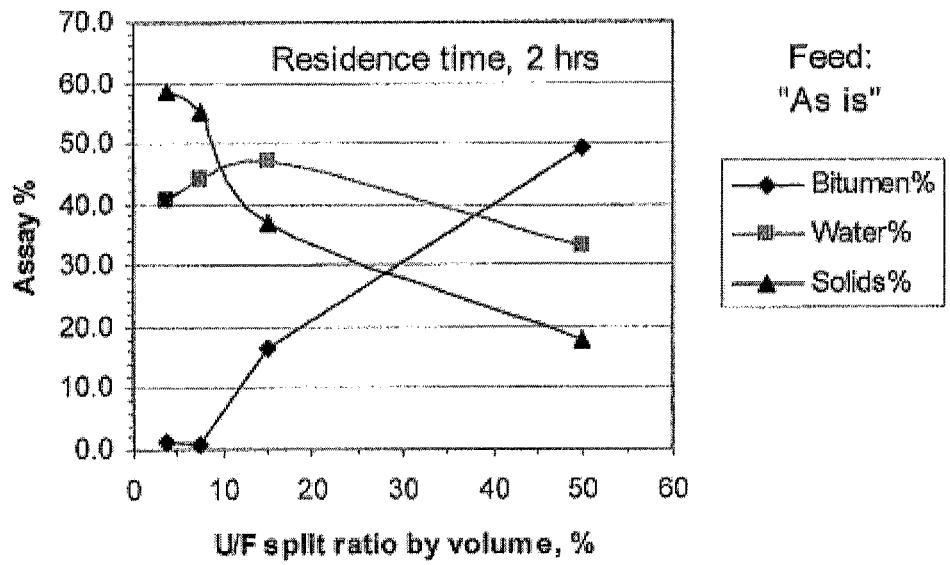
FIGS. 7A-B are graphs showing the effect of U/F split ratios on underflow component contents.
Figure 7B:
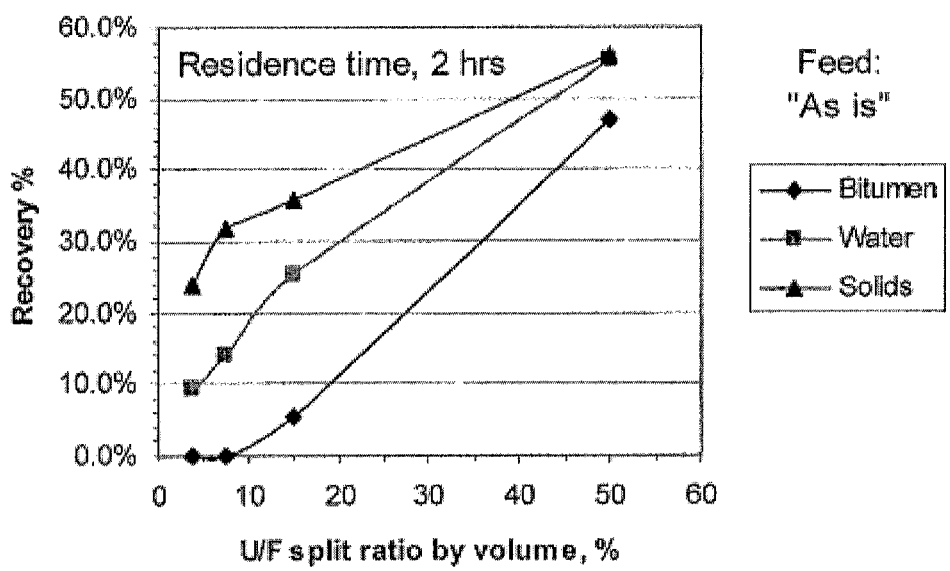
Figure 8A:
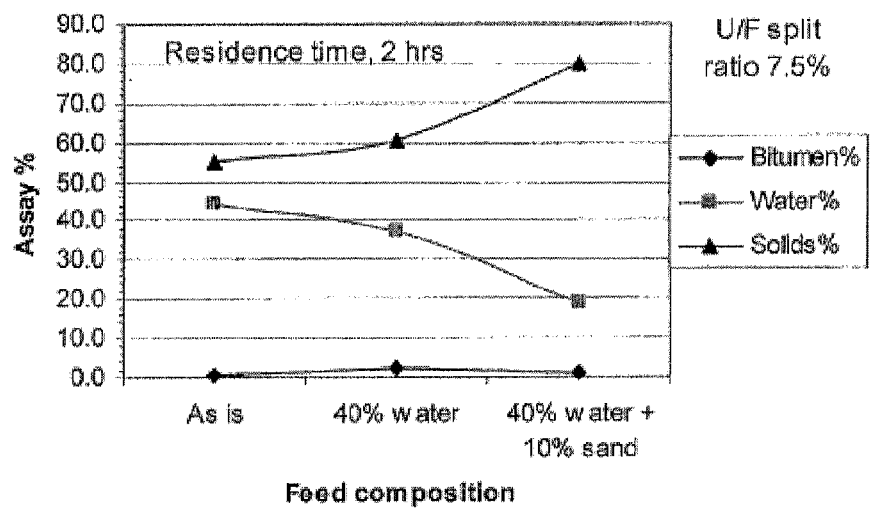
FIGS. 8A-B are graphs showing the effect of feed composition on U/F component contents when the U/F split ratio is 7.5%.
Figure 8B:
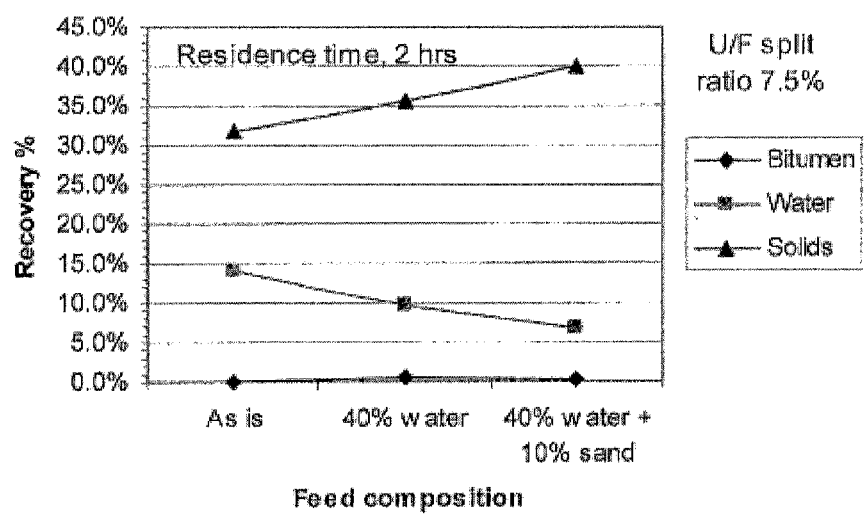
Figure 9A:
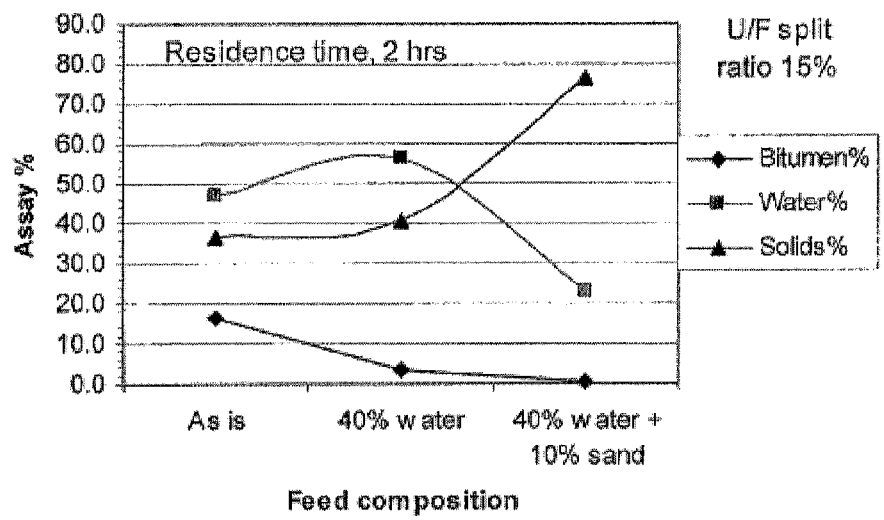
FIGS. 9A-B are graphs showing the effect of feed composition on U/F component contents when the U/F split ratio is 15%.
Figure 9B:
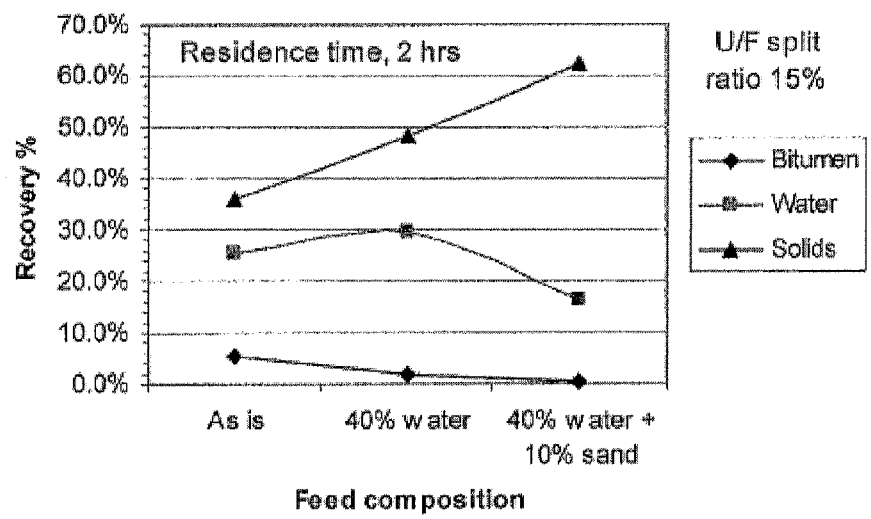
Figure 10A:
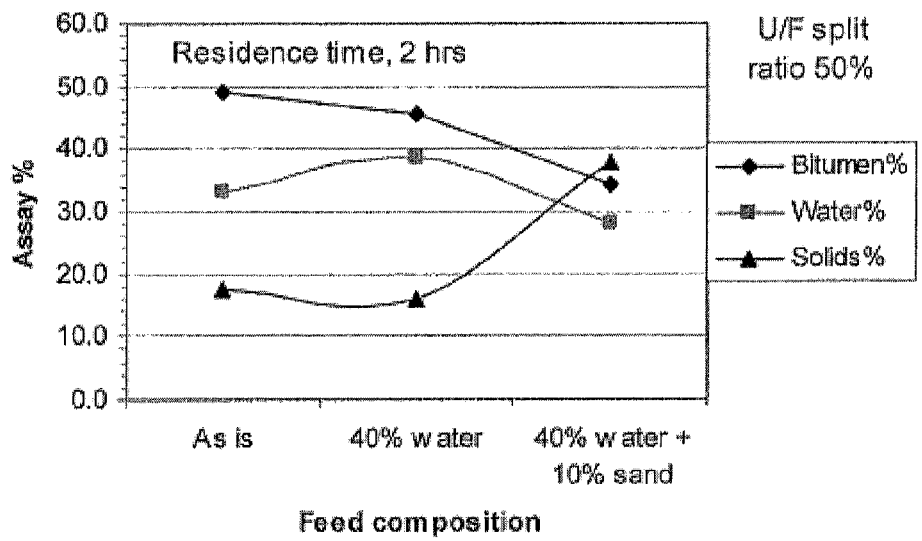
FIGS. 10A-B are graphs showing the effect of feed composition on U/F component contents when the U/F split ratio is 50%.
Figure 10B:
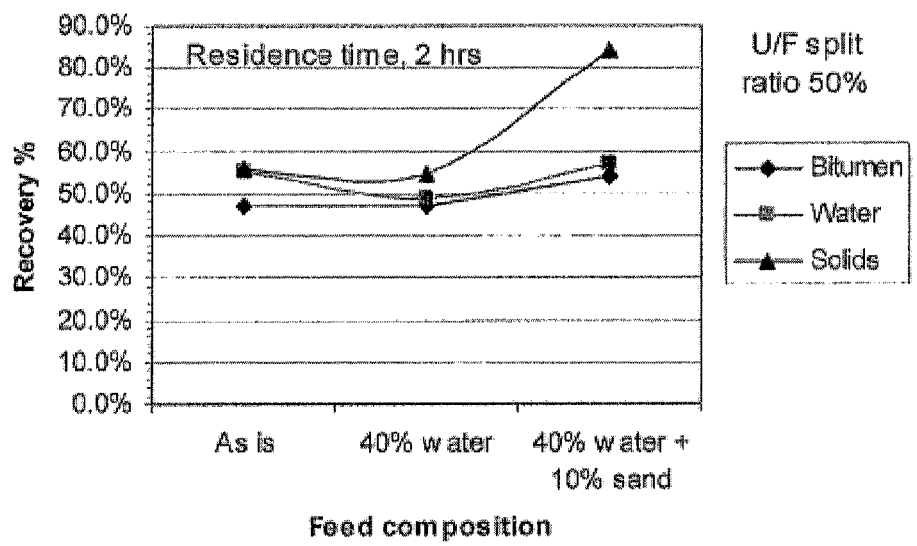

The locations of samples withdrawn at different elevations above the knuckle of the froth tank are shown in FIG. 3. The profiles of the sampled bitumen, water, solids and fines at residence times of 1, 2 and 4 hours are shown graphically in FIGS. 4 and 5. The effect of residence time on underflow component contents is shown in FIGS. 6A-B. The effect of U/F split ratios on underflow component contents is shown in FIGS. 7A-B, The effects of feed composition on underflow component contents when the U/F split ratio is 7.5%, 15% and 50% are shown in FIGS. 8A-B, 9A-B, and 10A-B, respectively.

For the feed "as is," a bulk residence time of 2 to 4 hours and a maximum U/F split ratio of 7.5% were required to produce an underflow which could be rejected as tailings. The minimum bulk froth residence time in the tank may be 2 hours, but can be varied between 2 to 24 hours depending upon the froth tank size and the feed rate. The optimal underflow split ratio to feed was about 7.5% by volume, but can be varied between 0 to 50% by volume depending on the feed froth compositions.

Figure 11A:
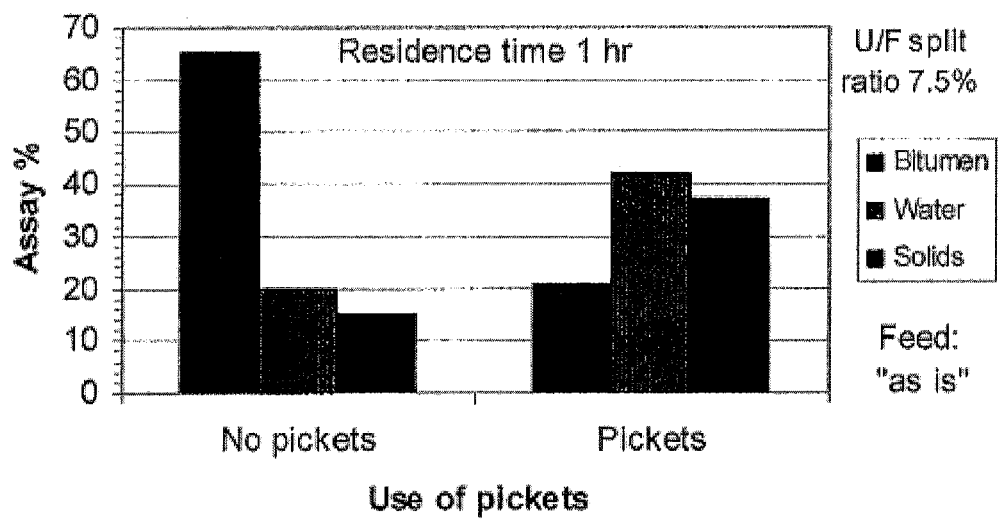
FIGS. 11A-B are graphs showing the effect of pickets on U/F component contents, with the common test conditions being a temperature of 80° C., U/F split ratio of 7.5%, residence time of 1 hour, and both feeds and middlings withdrawal elevation 1 m above the knuckle of the froth tank.
Figure 11B:
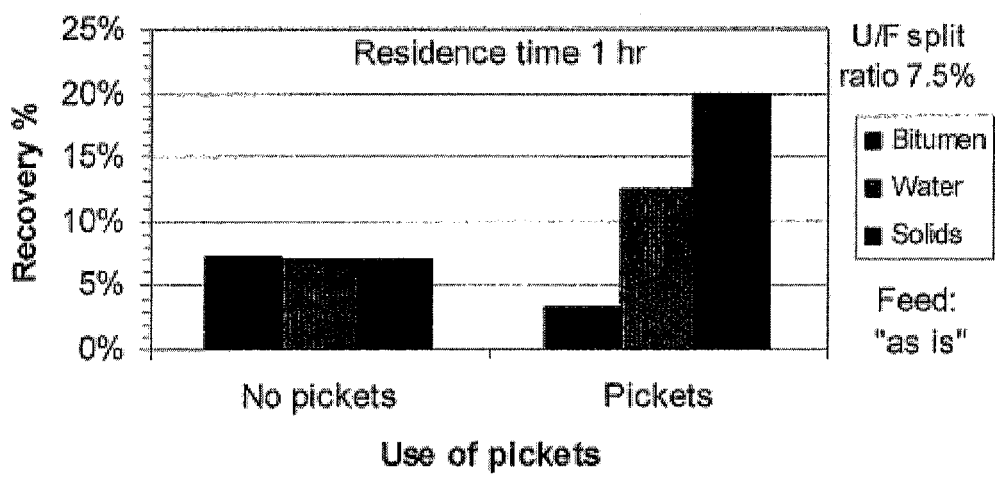

The use of pickets significantly improved the solids/water and the bitumen separation by creating channels within which solids/water easily settled downward (FIGS. 11A-B.) The optimal temperature of the de-aerated bitumen froth fed to the tank was about 80° C., but can be varied between about 50° C. to 80° C.

The froth tank was capable of producing a stream with >90% bitumen, 6% water and 4% solids from the top of the tank; a middling stream with about 65% bitumen, 25% water and 10% solids from the middle of the tank sidewall; and an underflow stream with about 0.5% bitumen, 44% water and 55.5% solids from the bottom of the tank. About 35-40% of the solids and about 15-20% of the water can thus be removed from bitumen froth before downstream processing.

EXAMPLE 2

Specifications for an Exemplary Cone-Bottomed, Raked Froth Tank

A suitable froth tank may be approximately forty meters in diameter, about eighteen meters in height, about 23,000 m$^3$ in volume, and have a cone slope of 1:6 in order to process about 1200 to 3500 m$^3$ per hour of feed, and to ensure the discharge of solids as tailings. The residence time may range between about 6 to 18 hours. The froth tank has an available volume for feed of about 20,000 m3 and operates at a level between about 15-90%. The nominal capacity is about 125 kBBL.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

References

The following references are incorporated herein by reference (where permitted) as if reproduced in their entirety. All references are indicative of the level of skill of those skilled in the art to which this invention pertains.

Du Toit, W.F. Liquids/solids separator. Canadian Patent Application No. 2,214,538, published Sep. 26, 1996.

Tipman, R. N., Rajan, V. S. V. and Wallace, E. D. Process for increasing the bitumen content of oil sands froth. Canadian Patent No. 2,055,213, issued Aug. 13, 1996.

What is claimed is:

1. A froth tank defining an inner chamber having a cylindrical upper portion and a conical lower portion, comprising:
    a plurality of stationary pickets extending downwardly into the cylindrical upper portion; and
    a plurality of movable pickets extending upwardly into the cylindrical upper portion;
    wherein the movable pickets are positioned to travel around the stationary pickets thereby generating flow channels in the cylindrical upper portion of the tank.

2. The tank of claim 1, further comprising a bridge portion spanning across the upper portion to support the stationary pickets and a rotary drive assembly.

3. The tank of claim 2, further comprising an elongate drive shaft mounted in a substantially vertical orientation within the inner chamber, and connecting the rotary drive assembly to a rake assembly mounted for rotation about a vertical axis within the lower portion.

4. The tank of claim 3, wherein the rake assembly comprises rake arms attached to the drive shaft and carrying the movable pickets.

5. The tank of claim 4, wherein the movable pickets extend parallel to one another vertically, and are sufficiently spaced apart to accommodate the stationary pickets extending downwardly therebetween.

6. The tank of claim 3, further comprising a torque sensor for detecting the torque exerted upon the drive shaft, and transmitting signals representative of the torque to a controller.

7. The tank of claim 1, wherein the slope of the lower portion is about 1:6.

* * * * *